C. SCHROEPFER.
ROUTER BIT.
APPLICATION FILED APR. 23, 1909.
948,904.
Patented Feb. 8, 1910.
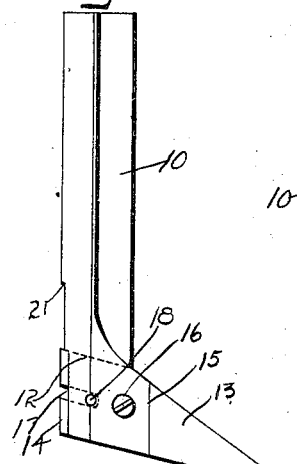
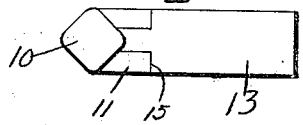
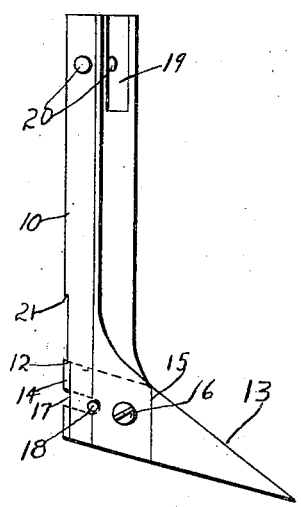
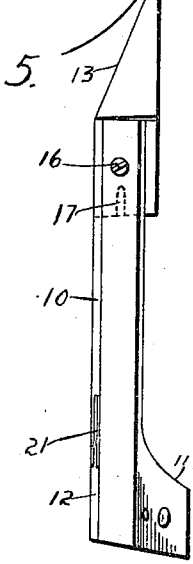
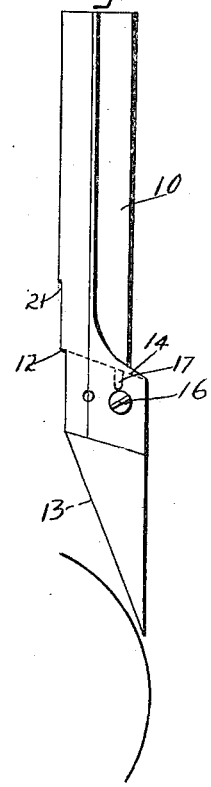
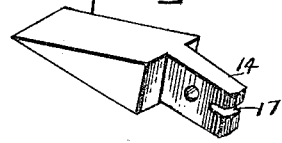
Witnesses
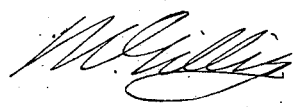
Inventor
Casper Schroepfer
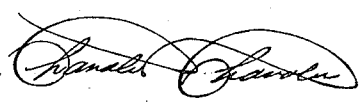
Attorneys

UNITED STATES PATENT OFFICE.

CASPER SCHROEPFER, OF DAVENPORT, IOWA.

ROUTER-BIT.

948,904.   Specification of Letters Patent.   Patented Feb. 8, 1910.

Application filed April 23, 1909. Serial No. 491,666.

*To all whom it may concern:*

Be it known that I, CASPER SCHROEPFER, a citizen of the United States, residing at Davenport, in the county of Scott, State of Iowa, have invented certain new and useful Improvements in Router-Bits; and I do hereby declare the following to be a full, clear, and exact description of the invention, such as will enable others skilled in the art to which it appertains to make and use the same.

This invention relates to carpenter tools and has special reference to a novel form of router bit.

One object of the invention is to provide a router bit with a detachable point so that the latter may be renewed or replaced without making it necessary to replace the entire shank.

A second object of the invention is to construct a router bit with a detachable point so that the shank may be made of an inferior grade of material while the point may be manufactured of a high grade of tool steel.

A third object of the invention is to provide a router bit with a shank having a detachable point so arranged that the point may be held in alinement with the shank for the purpose of sharpening the same.

A fourth object of the invention is to provide a router bit with a shank having its upper end slotted for the reception of the bit point when detached from the lower end of the shank so that said bit point may be held in proper position for sharpening.

With the above and other objects in view the invention consists in general of a router bit provided with a shank having a detachable point secured thereto.

The invention further consists in certain novel details of construction and combinations of parts hereinafter fully described, illustrated in the accompanying drawings, and specifically set forth in the claims.

In the accompanying drawings, like characters of reference indicate like parts in the several views, and Figure 1 is a side elevation of one form of this invention. Fig. 2 is a top plan view thereof. Fig. 3 is a view of Fig. 1 with the bit point arranged in alinement with the shank for the purpose of sharpening the same. Fig. 4 is a view of a modification of the invention. Fig. 5 is another view of this modification with the bit point held in the upper end of the shank.

Fig. 6 is a perspective view of the bit point removed from the shank.

The numeral 10 indicates the shank of a router bit as constructed in accordance with this invention. It is a well known fact that in all devices of this character commonly used the shank of the bit is in the form of a square prism having its edges squared off and that it is arranged in the router with the diagonal of the square held in the direction of movement of said router. The present shank has therefore been shown of this description. At the bottom of this shank there is provided a forward extension 11 and this forward extension consists of a pair of spaced arms the opening between which is continued through the bottom of the shank as at 12. There is thus formed in the bottom of the shank a through slot. At 13 is a bit point and this bit point is of the usual wedge shape and is further provided with a rearwardly extending tongue 14 which is adapted to closely fit in the through slot 12 while the shoulders 15 between the body 13 and the tongue 14 fit up against the front edges of the forwardly extending members of the shank 10. A screw 16 passes through the shank and the tongue 14 and serves to hold the bit point firmly in position. The tongue 14 is further provided with a slotted recess 17 and a pin 18 passes through the lower end of the shank and enters this slot, the purpose of the pin and slot being to assist in holding the bit point 13 in proper position on the shank 10. In the form of the device shown in Figs. 4 and 5 the shank is further provided with a through slot 19 having suitable screw receiving apertures 20 extending through the shank on either side thereof. The screw 16 is countersunk into the shank and is of just sufficient length to come flush with the other side so that it does not contact with the material being routed.

In the form shown in Figs. 1 and 3 when it is desired to put the bit in position for sharpening it is simply necessary to remove the pin 18 and the screw 16 when the pin may be turned into the position shown in Fig. 3 and the screw reinserted. In this position the back edge of the tongue 14 will bear against the upper end of the slot 12 and the bit will be held rigidly so that it may be applied to a grind-stone as indicated by the curved line below the bit in Fig. 3 thus permitting it to be ground in the same manner as an ordinary chisel. Furthermore the bit may be whetted on a whet stone in the same manner as a common chisel.

In the form shown in Figs. 4 and 5 when it is desired to sharpen the bit it is removed from the lower slot 12 and placed in the upper slot 19 as clearly shown in Fig. 5. In this position it may be treated exactly as the bit shown in Fig. 3.

There has thus been provided a simple and efficient device of the kind described and for the purpose specified.

It is to be observed that by this construction the bit, being detachable, may be made of a high grade of tool steel while the shank may be made of a low grade of material and that the bit is held on the shank without rendering it necessary to force the same together and necessitating the throwing away of the entire tool should the point become badly nicked or broken.

In order that the sides of the shank may be more readily drawn together the slot in the bottom thereof is extended upward as shown at 21.

Having thus described the invention, what is claimed as new, is:—

1. In a bit, a shank provided with a forwardly extending projection comprising a pair of spaced arms and further provided with a slot forming a continuation of the space between said arms, a cutting point having an end fitting said slot, and means for attaching the point to the shank to hold the point to project laterally from the shank or in alinement thereto.

2. In a bit, a shank provided with a forwardly extending projection comprising a pair of spaced arms, and further provided with a slot forming a continuation of the space between said arms, a cutting point provided with a reduced tongue held within the slot and the space between said arms, and forming shoulders bearing against the ends of the arms, and means for attaching the point to the shank to hold the point to project laterally from the shank or in alinement thereto.

3. In a bit, a shank provided with a forwardly extending projection comprising a pair of spaced arms and further provided with a slot forming a continuation of the space between said arms, a cutting point provided with an end fitting said slot, means to hold said cutting point to project laterally from the shank in said slot, said shank being provided with a second slot in the opposite end thereof, and means to hold said point to project from the last mentioned slot in alinement with the shank.

4. In a bit, a shank provided with a forwardly extending projection comprising a pair of spaced arms and further provided with a slot forming a continuation of the space between said arms and a slot at the opposite end thereof arranged in angular relation to the first mentioned slot, a cutting point provided with a reduced tongue adapted to be held within either of said slots, said tongue forming shoulders to bear against the ends of said arms when the point is held in the first mentioned slot, and means to hold the point to project laterally from the first mentioned slot and in alinement with the shank from the second mentioned slot.

In testimony whereof, I affix my signature, in presence of two witnesses.

CASPER SCHROEPFER.

Witnesses:
   Geo. Butenschoen,
   L. M. Fisher.